March 18, 1958     H. C. WHITE, JR     2,827,318
HANDLE CONNECTOR
Filed June 15, 1956
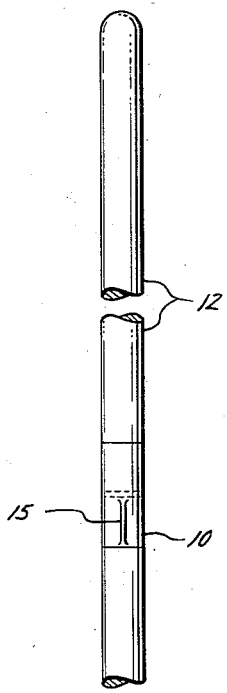
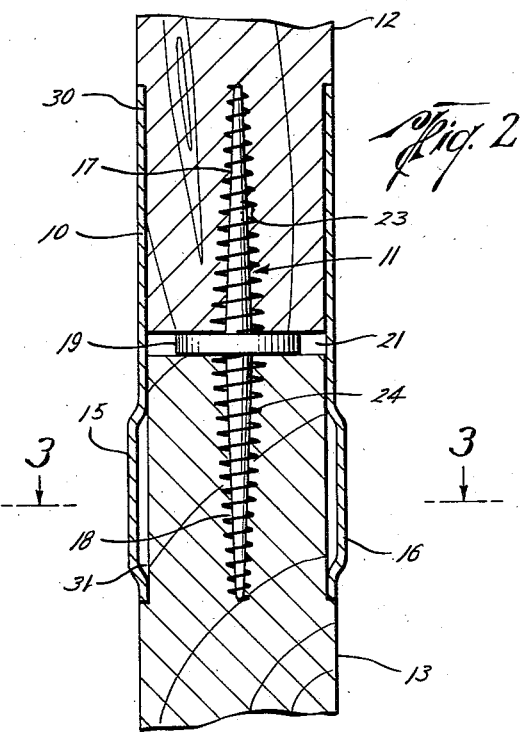
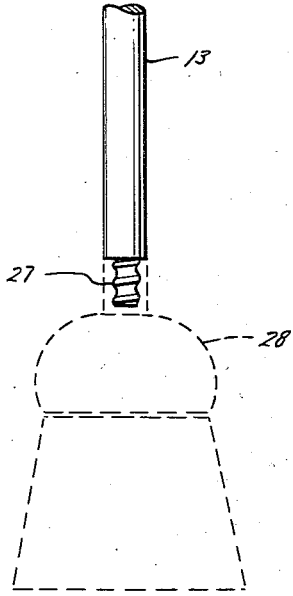
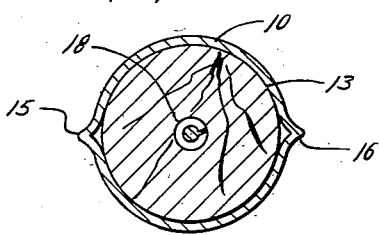
Herbert C. White, Jr.
INVENTOR.
BY *Carl B. Foy, Jr.*
ATTORNEY United States Patent Office 2,827,318
Patented Mar. 18, 1958

2,827,318

HANDLE CONNECTOR

Herbert C. White, Jr., Lufkin, Tex., assignor of fifty percent to Temple-White Company, Inc., Diboll, Tex., a corporation of Texas Application June 15, 1956, Serial No. 591,717

2 Claims. (Cl. 287—108)

This invention relates to joints and connectors for sectional handles, poles, shafts, and the like.

A principal object of the invention is to provide a connector for sectional handles whereby the handle may be made, sold, and packaged disassembled and may be readily and easily assembled for use.

Another object of the invention is to provide a sectional handle having such a connector which when assembled is rigid, strong, and dependable.

Another object of the invention is to provide such a handle which has no protrusions at the joint and which is pleasing in appearance.

Another object of the invention is to provide a connector which has no sharp parts exposed when assembled or disassembled and is therefore safe in the home.

The connection provided by this invention is unique. It joints perfectly multiple-element handles, poles, shafts and the like into rigid structures which are as strong as conventional one-piece structures. By using the connector of this invention it will be possible to store items such as brooms, mops, and tent poles in small closets, in small packages, and in automobiles. Therefore, the invention will be of considerable importance in the home, on trips, and to sporting enthusiasts.

Other objects and advantages of the invention will appear from the following description of a preferred embodiment thereof, reference being made to the accompanying drawings, of which:

Figure 1 is a side elevation, partly of schematic representation, of a two-piece sectional handle incorporated into a broom;

Figure 2 is a vertical axial section of the sectional handle connector; and,

Figure 3 is a horizontal section of the connector taken at line 3—3 of Figure 2.

Referring now to the drawings, in detail, the connector is formed by an outer sleeve 10, and an inner screw 11, which latter is of a particular special design. Two handle sections 12, 13, are joined by the connector into a rigid handle of a strength comparable to a handle having no joint.

The sleeve 10 is of a diameter to easily but snugly slide over each of the handle sections 12 and 13. The sleeve is slid to about half its length over the handle section 13 and is crimped at opposite sides 15, 16, to be held firmly in place thereon. The opposite end of the sleeve extends from the end of handle section 13 to receive the end of handle section 12. The sleeve 10 is usually made of lightweight welded or seamless tubing, which is of uniform thickness and strength in all radial directions. The sleeve may be formed of any metal or metal-like material of low elasticity and high strength.

The screw 11 is of approximately the same length as the sleeve 10, and has two threaded end portions 17 and 18 and a central flange portion 19. The flange 19 is of a diameter about two-thirds the internal diameter of sleeve 10, or smaller, and of an axial thickness sufficient to keep the ends of handle sections 12, 13, slightly separated by an annular space 21 after the connection is made up. The purpose of this spacing will be more fully explained later. The threaded end portions 17 and 18 may be tapered, but are preferably non-tapered. The tapered showing in Figure 2 is conventional. The sleeve shields the end of screw end 17 when the handle section 12 is disassembled.

The handle section 12 has a parallel-sided axial bore 23 at the end to be connected which is drilled to threadingly receive the threaded end 17 of the screw 11. The handle section 13 has a corresponding axial bore 24 to receive the other threaded end 18 of screw 11.

In Figure 1 of the drawings the handle section 13 is shown as having a reduced threaded end 27 by means of which a straw broom 28 is connected in the ordinary manner. The broom portion of Figure 1 is shown schematically by dashed lines. The invention is equally applicable to devices other than broom handles, wherever a sectional pole, shaft or the like is desired. Therefore, among the things for which the invention will be useful are broom handles, mop handles, rake handles, other yard equipment handles, tent poles, awning supports, and many others.

The handles, poles, and the like are supplied with the sleeve affixed by crimping to one of the handle or pole sections and with the screw 11 screwed into the drilled hole 24 within the crimped sleeve end. The other handle section has only the drilled axial hole 23. To complete the assembly of the handle or pole, the purchaser has only to insert the handle section 12 into the free end of the sleeve and rotate one of the handle sections to screw the threads 17 into the hole 23 until the flange portion 19 of screw 11 contacts the end of the handle section 12 and the screw end is firmly tightened into hole 23. The sleeve 10 then flushly overlaps the joint between the handle sections, making the connection of neat appearance and of great strength.

As best shown in Figure 2, sleeve-receiving recesses 30 and 31 are formed around the handle sections 12 and 13, respectively, so that the outer surface of sleeve 10 is flush with both handle sections. While this structure is preferred because of the better appearance, the recesses may be omitted if desired without affecting the utility of the joint.

The joint is easily assembled or made up. All that is necessary for the user to do to join the handle sections is to insert the handle section 12 into the sleeve connected to handle section 13 and then rotate either handle section to thread the screw portion 17 into the hole 23. Once the end of handle section 12 contacts the upper side of collar 19, a quick hard turn will tighten the joint so that it will not loosen during use of the handle or pole.

The handle connector of this invention will be most often used with handle or pole sections made of wood. But the connector may be easily adapted for use with sectional handles and poles made of other materials such as metals and plastics.

The collar or flange 19 around the screw 11 serves to make tightening and loosening of the connection easier. Were the collar not provided the ends of the handle sections, which are usually somewhat rough, would be turned against one another as the connection is tightened, or loosened, resulting in the necessity of harder rotation of the handle sections to either tighten or loosen the connection. The collar 19 provides a smooth surface against which the handle sections are tightened, so that the last few turns during tightening and the first few turns during loosening are made far simpler. Also, the annular space 21 around the collar prevents fraying or splitting of the outer portions of the handle sections, and the reduced lateral area of the collar makes tightening and loosening of the joint easier because the contact areas of the handle ends are reduced.

While a preferred embodiment of the invention has been shown and described herein, many modifications thereof may be made by a person skilled in the art without departing from the function of the invention, and it is intended to protect by Letters Patent all forms of the invention falling within the scope of the following claims.

I claim:

1. A device for axially connecting cylindrical elements of the same diameter end-to-end, comprising sleeve means across the connection between two elements ends for retaining said elements in alignment, said sleeve means being crimped outwardly of one element end to be secured thereto, and a screw having two threaded ends and, intermediate said threaded ends, a projecting collar of lesser diameter than the diameter of said elements, one threaded end of said screw being screwed axially into said one element end and disposed within said sleeve means, the other element end being removably received within said sleeve and screwed onto the other threaded end of said screw whereby said element ends are connected by said screw, said collar contacting and axially spacing said connected element ends within said sleeve means and providing a smooth, reduced, end contact area for said element ends whereby said joint is easily assembled and disassembled.

2. The combination of claim 1 wherein said element ends are recessed and wherein said sleeve means is slidably received into said recesses, whereby said joined elements have a smooth and uniform outer surface.

References Cited in the file of this patent

UNITED STATES PATENTS

| | | |
|---|---|---|
| 159,105 | Light | Jan. 26, 1875 |
| 1,467,115 | Rauhoff | Sept. 4, 1923 |
| 1,679,073 | Carmichael | July 31, 1928 |
| 1,741,720 | Jolley | Dec. 31, 1929 |
| 2,038,535 | Brenizer | Apr. 28, 1936 |